United States Patent
Hanabusa et al.

(10) Patent No.: US 6,196,367 B1
(45) Date of Patent: Mar. 6, 2001

(54) POWER TRANSMISSION APPARATUS OF WORKING MACHINE

(75) Inventors: Jitsumi Hanabusa; Yoshitaka Ohta, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/456,914

(22) Filed: Dec. 9, 1999

(30) Foreign Application Priority Data

Dec. 9, 1998 (JP) .................................. 10-349477

(51) Int. Cl.[7] ................................ B60K 41/22; F16H 9/14
(52) U.S. Cl. .............................................. 192/3.54; 474/19
(58) Field of Search ........................... 192/3.54; 474/19; 56/11.6, 11.8

(56) References Cited

U.S. PATENT DOCUMENTS

| | | | |
|---|---|---|---|
| 3,342,079 | * 9/1967 | Yoshigaki et al. ................. | 474/19 |
| 4,321,991 | * 3/1982 | Teijido et al. ..................... | 474/19 X |
| 5,377,774 | * 1/1995 | Lohr .................................. | 180/19.3 |
| 5,788,592 | * 8/1998 | Nycz et al. ......................... | 474/38 |

* cited by examiner

Primary Examiner—Richard M. Lorence
(74) Attorney, Agent, or Firm—Armstrong, Westerman, Hattori, McLeland & Naughton

(57) ABSTRACT

A power transmission apparatus of a working machine transmits power of an engine to a drive wheel through a drive pulley, a belt, a driven pulley, an input shaft and a clutch. The driven pulley has a movable sheave fitted to the input shaft so as to rotate and move in the axial direction, and a fixed sheave fixed to the input shaft. When the clutch disconnects the movable sheave moves away from the fixed sheave, and when the clutch connects the movable sheave moves toward the fixed sheave. The engine power can be transmitted gradually avoiding abrupt transmission when the clutch connects.

5 Claims, 7 Drawing Sheets

F I G. 10
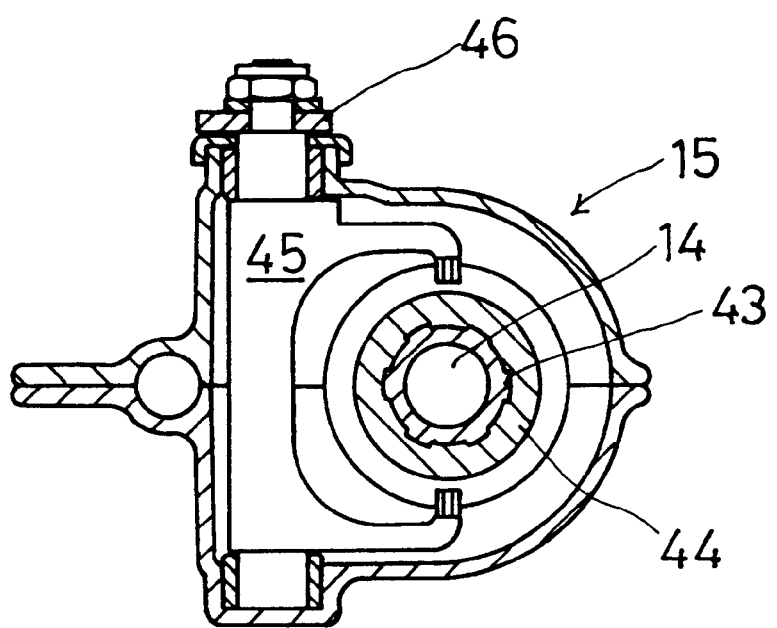

POWER TRANSMISSION APPARATUS OF WORKING MACHINE

BACKGROUND OF THE INVENTION

The present invention relates to a power transmission apparatus of a working machine having a clutch for transmitting engine power to a drive wheel of the working machine, particularly to a power transmission apparatus of a self-propelled working machine such as a lawn mower and a grass mower in which engine power is transmitted to a clutch through a belt and a pulley for disconnecting and connecting the power with a drive wheel.

Japanese Laid-Open Patent Publication No. 61-55412 or U.S. Pat. No. 4,117,652 discloses a power transmission apparatus having a clutch provided at a rear axle to which engine power is transmitted through a belt device for driving a rear wheel of a working machine.

In the prior art, an engine mounted on a body of a self-propelled lawn mower has an output shaft extending vertically downward and a cutter blade and a drive pulley are fitted to the output shaft. On the one hand, a rear axle of the lawn mower is provided with a clutch for disconnecting and connecting engine power with the rear wheel. An input shaft for transmitting engine power to the clutch extends vertically in a transmission case holding the rear axle supported rotatably. A driven pulley is attached to the input shaft. A belt is wound round the drive pulley and the driven pulley. The driven pulley has a fixed sheave and a movable sheave which is movable in an axial direction of the input shaft toward or away from the fixed sheave to change an effective diameter of the pulley for speed change. The engine power is transmitted to the driven pulley from the drive pulley through the belt to rotate the input shaft. When claws of the clutch are engaged so that the clutch connects, rotation of the input shaft is transmitted to the rear axle to rotate the rear wheel and lawn mower can be self-propelled.

In the above-mentioned power transmission apparatus, when the clutch connects, power of the drive pulley acts on the clutch abruptly through the input shaft and also reaction force due to rapid drive of the stopped wheel acts on the clutch so that the clutch is burdened with a large load. Therefore, it is required to raise rigidity of the clutch to cause enlargement and weigh increasing of the apparatus. As a result, working and operation of the lawn mower are deteriorated. Further, the above-mentioned reaction force influences the belt wound round both the pulleys too, so as to give the belt an excessive tension to shorten its life.

In a lawn mower having the power transmission apparatus mounted, because on connection of the clutch, engine power is transmitted to the rear wheel abruptly and the rear wheel having been stopped is driven rapidly at a high rotative speed, grasses are fallen down or torn and sometimes the ground is scraped by the rear wheel, so that finished state of the lawn is not necessarily good.

An object of the present invention is to overcome the above-mentioned difficulties and provide a power transmission apparatus of a working machine in which on connection of the clutch, an abrupt transmission of engine power is avoided and the engine power can be transmitted gradually.

SUMMARY OF THE INVENTION

The present invention provides a power transmission apparatus of a working machine comprising a clutch disconnecting and connecting power of an engine with a drive wheel, an input shaft transmitting the power to the clutch, a pulley having a movable sheave fitted to the input shaft rotatably and movably in an axial direction of the input shaft and a fixed sheave fixed to the input shaft, a belt wound round the pulley transmitting the power to the input shaft through the pulley, and movable sheave position control means for moving the movable sheave away from the fixed sheave when the clutch disconnects and move the movable sheave toward the fixed sheave when the clutch connects.

According to the invention, when the clutch disconnects, the movable sheave is moved away from the fixed sheave so that both the sheaves are most distant from each other. Therefore, the belt wound round the pulley is moved in a radial direction of the pulley to be contacted with the pulley at a position of smallest diameter and runs slipping in a state that the belt tension is smallest, while the pulley driven by the belt rotates on a non-load condition. In this state, abrasion of the belt due to contact with the pulley is little since the belt tension is smallest, and life of the belt can be prolonged since stress caused in the belt is small.

When the clutch connects from the above-mentioned disconnecting state, the movable sheave is moved toward the fixed sheave to gradually reduce the distance between the sheaves, therefore the contact position of the belt with the pulley moves radially outward (that is, the effective diameter of the pulley increases) while the running of the belt with slippage is maintained. Then, the belt tension is gradually increased and the slippage of the belt is gradually decreased. When approach of the movable sheave to the fixed sheave is completed and the effective diameter of the pulley becomes maximum, a predetermined pulley tension is generated to diminish the belt slippage so that engine power is transmitted to the drive wheel efficiently.

Thus, when the clutch begins to connect, the belt is running with slippage, therefore engine power is not transmitted to the drive wheel abruptly but transmitted gradually. Accordingly, a large load does not act on the clutch suddenly so that rigidity of the clutch can be made lower than that of a conventional clutch. Further, miniaturization and lightening of the apparatus are possible. Since no excessive tension is generated in the belt, life of the belt is prolonged.

In the above power transmission apparatus, the movable sheave position control means may comprise a spring having an end fixed to the movable sheave and another end fixed to the fixed sheave or the input shaft for moving the movable sheave away from the fixed sheave when the clutch disconnects, a first engagement section provided on the movable sheave, and a second engagement section provided on the fixed sheave or the input shaft which is engaged with the first engagement section by relative rotation between the movable sheave and the fixed sheave to move the movable sheave toward the fixed sheave against spring force of the spring when the clutch connects.

In this apparatus, when the clutch is in a disconnecting state, the movable sheave rotates together with the fixed sheave which is connected to the movable sheave by spring force of the spring, further the movable sheave has been moved away from the fixed sheave by spring force of the spring and both the sheaves are most distant from each other. When the clutch connects, load of the drive wheel acts on the input shaft through the clutch and the fixed sheave is subjected to a resistant force in a direction opposing rotation of it. On the one hand, to the movable sheave which is rotatively independent of the input shaft is not directly transmitted the load of the drive wheel. As a result, when a force based on a frictional force acting on the movable sheave and the resistant force acting on the fixed sheave becomes larger than the spring force, a relative rotation or a difference of rotational speeds occurs between the movable sheave and the fixed sheave against the spring force. Due to this relative rotation, the first and second engagement sections engage with each other to move the movable sheave toward the fixed sheave so as to decrease the distance between both the sheaves gradually. Thus, movement of the movable sheave toward the fixed sheave on connection of the clutch is performed automatically by engaging of both engagement sections utilizing the relative rotation between both sheaves.

The first engagement section may be a circumferential slant formed on the movable sheave, and the second engagement section may be a pin fixed to the input shaft. These engagement sections formed by the slant and the pin are simple in construction.

The spring may be a torsion coil spring. Torsional force and tensile force of the spring can be utilized to return the movable sheave to the distant position surely when the clutch disconnects.

The clutch may be a claw clutch. Since inconveniences caused by a rapid power transmission characteristic of the claw clutch are dissolved, the advantage of the claw clutch that the construction is simple and the cost is low can be exhibited fully.

BRIEF DESCRIPTION OF THE DRAWINGS

FIG. 10 is a partial sectional view of the transmission case taken along the line X—X of FIG. 9.

DETAILED DESCRIPTION OF PREFERRED EMBODIMENT OF THE INVENTION

Hereinafter, a power transmission apparatus of a working machine according to a preferred embodiment of the present invention will be described with reference to FIGS. 1 to 10. In this embodiment, the working machine is a self-propelled lawn mower.

Figure 1:
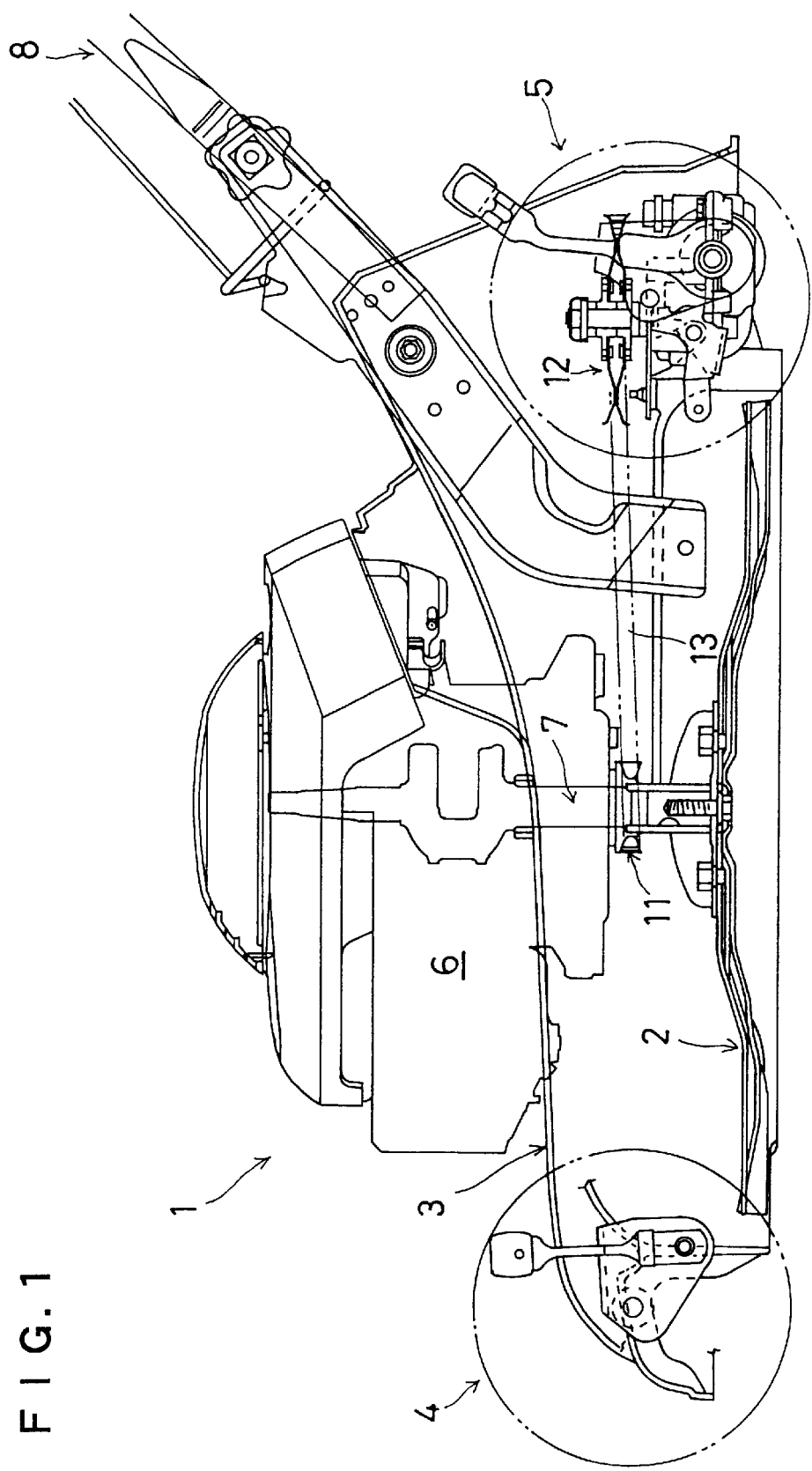
FIG. 1 is a schematic view of a self-propelled lawn mower mounted with a power transmission apparatus according to an embodiment of the present invention.

The lawn mower 1 shown in FIG. 1 has a cutter housing accommodating a cutter blade 2, a pair of front wheels 4 and a pair of rear wheels 5. On a center of the cutter housing 3 is mounted an engine 6 having a crankshaft 7 extending downward vertically. On a lower portion of the crankshaft 7 is attached a drive pulley 11 for transmitting power of the engine 6 to the rear wheel 5. The cutter blade 2 is attached to the crankshaft 7 at a position below the drive pulley 11. 8 denotes a handle of the lawn mower 1.

A transmission case 15 holding a rear axle 14 (FIG. 2) is disposed near the rear wheel. The transmission case 15 supports a vertical input shaft 16 rotatably by means of a bearing. An upper portion of the input shaft 16 outside of the transmission case 15 is attached with a driven pulley 12, and a lower portion of the input shaft 16 inside of the transmission case 15 is attached with a pinion gear 17 which is a bevel gear. A belt 13 is wound round the drive pulley 11 and the driven pulley 12, so that power of the engine 6 is transmitted to a clutch (to be mentioned later) through the drive pulley 11, the belt 13, the drive pulley 12, the input shaft 16 and a speed change mechanism 31 (to be mentioned later) shown in FIG. 9. The engine power is transmitted to the rear wheel 5 through the clutch 41.

Figure 9:
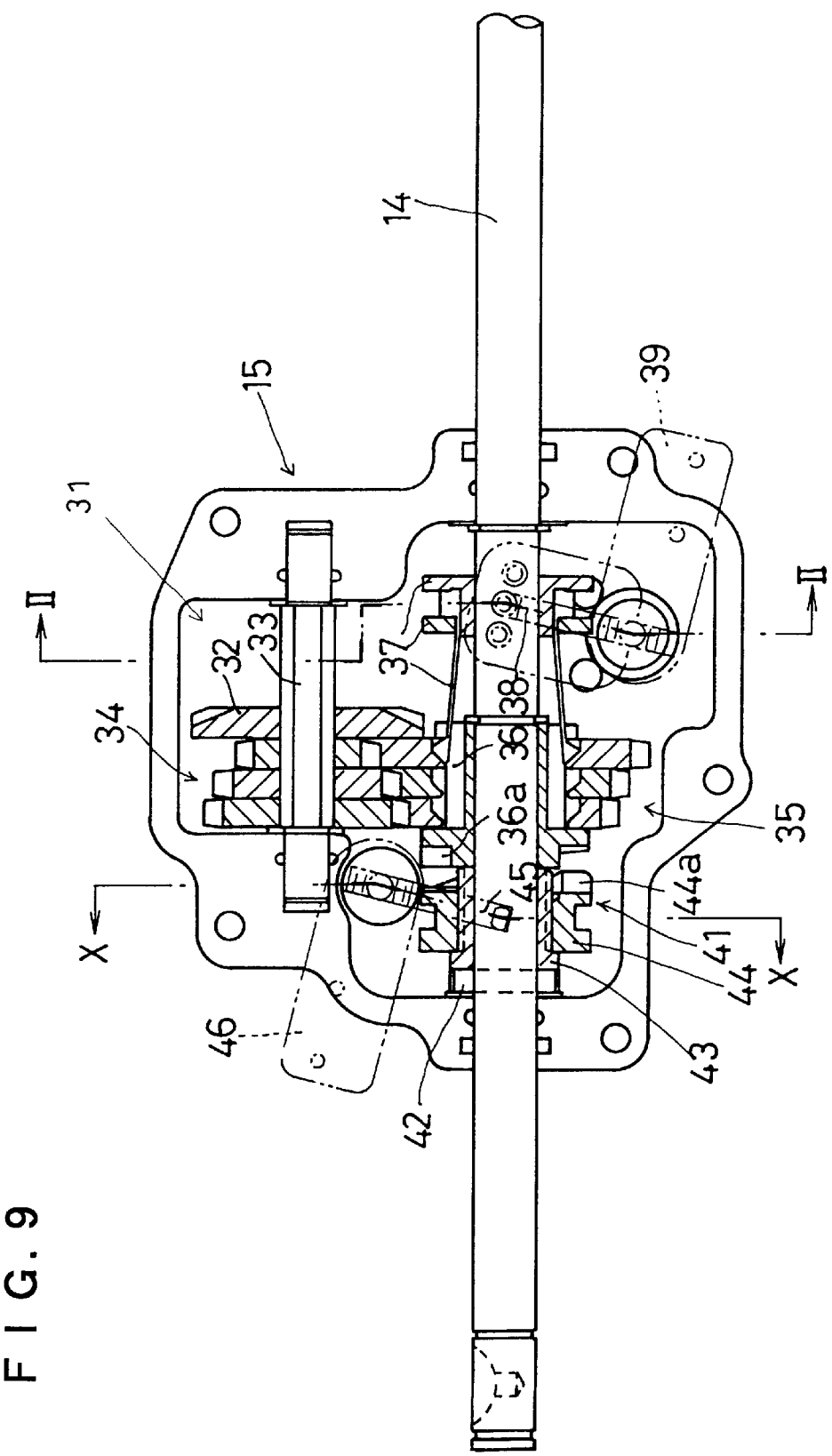
FIG. 9 is a cross section of the transmission case.

As shown in FIG. 9, the speed change mechanism 31 comprises a bevel gear 32 meshed with the pinion gear 17, a drive shaft 33 fixed with the bevel gear 32, three drive gears 34 fixed to the drive shaft 33, a key 37 fitted on the rear axle 14 so as to slide in the axial direction, three driven gears 35, and a hub 36 rotatably fitted on the axle 14. The driven gears 35 mesh with the respective corresponding drive gears 34 and rotatively fixed to the hub 36 by the key 37 selectively. Rotation of the input shaft 16 is transmitted to the hub 36 through the pinion gear 17, the bevel gear 32, the drive shaft 33, the drive gear 34, the driven gear 35 and the key 37.

The key 37 has an outer periphery formed with a circumferential annular groove which is engaged with a speed change shift fork 38 to slide the key 37 toward the hub 36. The shift fork 38 has an integral shaft portion rotatably supported by the transmission case 15. To an end of the shaft portion is fixed an arm 39 having an end connected to a speed change operation lever (not shown) through a wire or the like. Therefore, when the speed change operation lever is operated, the shift fork 38 is rotated and the key 37 engaged with the shift fork 38 slides along the axle 14 to engage with a particular driven gear for speed change.

The clutch 41 shown in FIGS. 9 and 10 comprises a spline shaft 43 fixed to the axle 14 by a pin 42, a shifter 44 fitted on the spline shaft 43 so as to slide along a spline groove formed on outer periphery of the shaft 43, a clutch claw 44a formed on the shifter 44, and a clutch claw 36a formed on a surface of the hub 36 facing toward the shifter 44. When the shifter 44 slides toward the hub 36 and the claws 36a, 44a engage with each other, the shifter 44 and the hub 36 rotate together as one body. Therefore, the clutch 41 is a claw clutch or a dog clutch.

The shifter 44 has a circumferential annular groove formed on the outer periphery and a clutch shift fork 45 engages with the annular groove for sliding the shifter 44 toward the hub. The clutch shift fork 45 has a shaft portion rotatably supported by the transmission case 15 so that the shift fork 45 rotates relatively to the transmission case 15. To an end of the shaft portion is fixed an arm 46 which has an end connected to a clutch operation lever (not shown) through a wire or the like. When the clutch operation lever is operated, the clutch shift fork 45 rotates, the shifter 45 engaging with the clutch shift fork 45 slides relatively to the spline shaft 43, and the clutch claws 36a, 44a engage and disengage with each other to perform connection and disconnection of the clutch 41.

Figure 2:
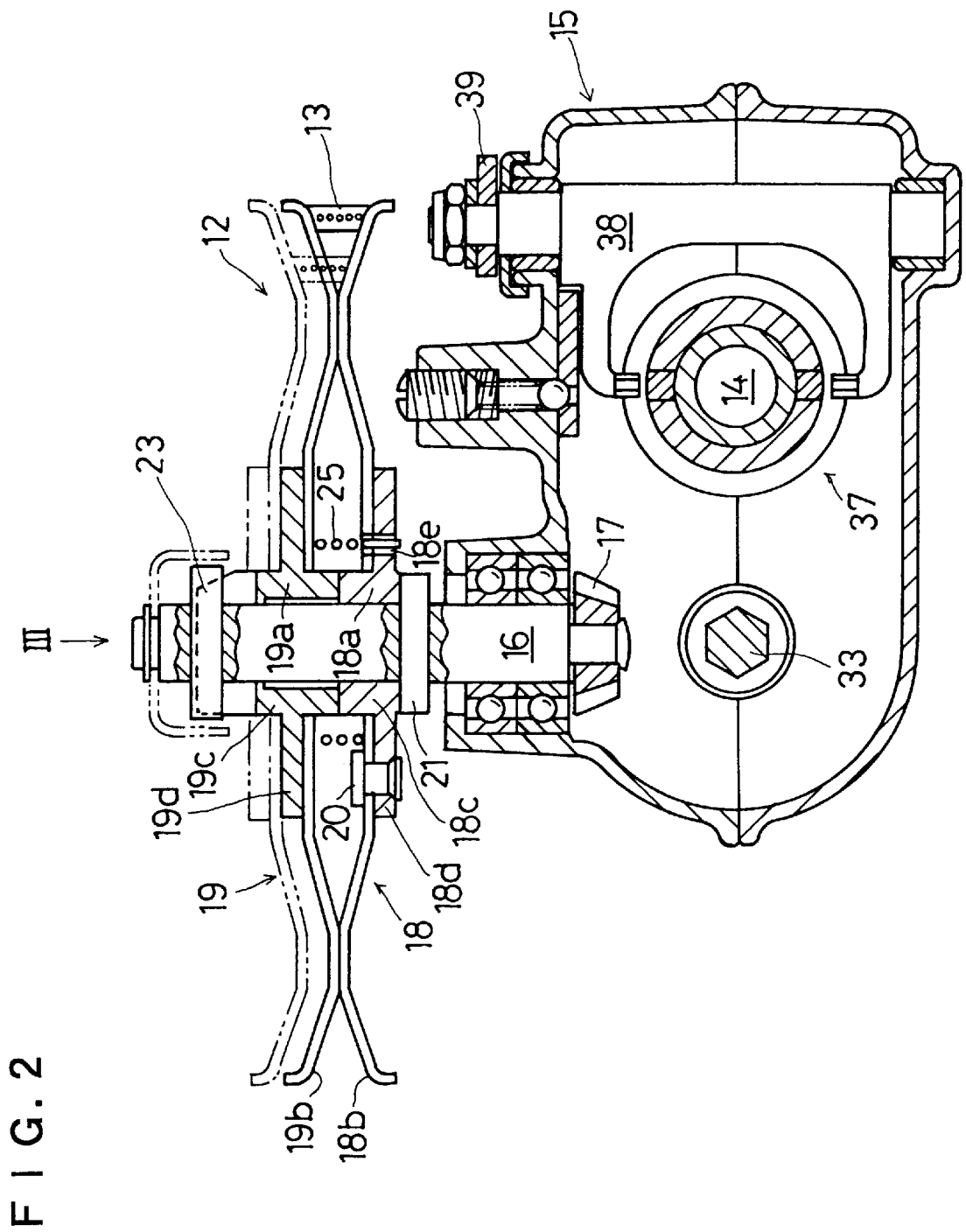
FIG. 2 is a sectional view of a driven pulley (taken along the line II—II of FIG. 3) and a transmission case (taken along the line II—II of FIG. 9)
Figure 3:
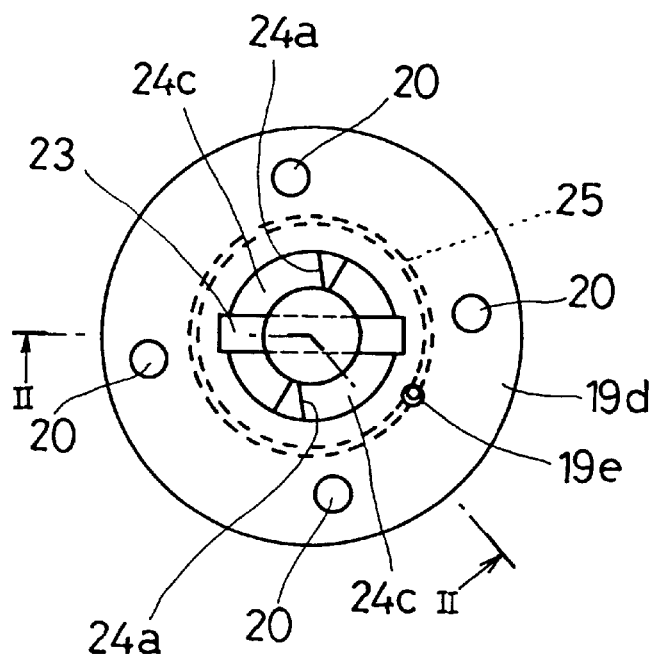
FIG. 3 is a partial plan view of FIG. 2 viewed in direction of the arrow III.
Figure 4:
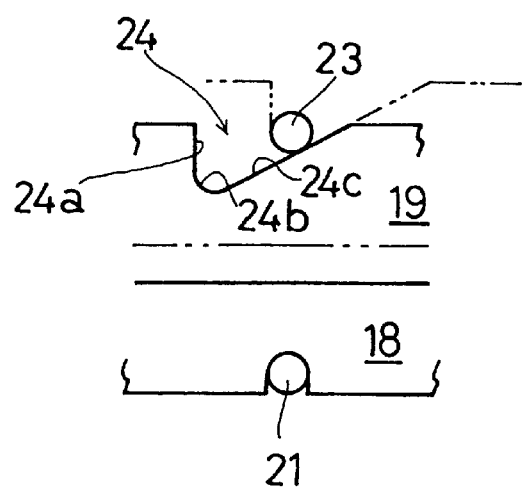
FIG. 4 is a view for explaining engagement of an upper pin and a slant.
Figure 5:
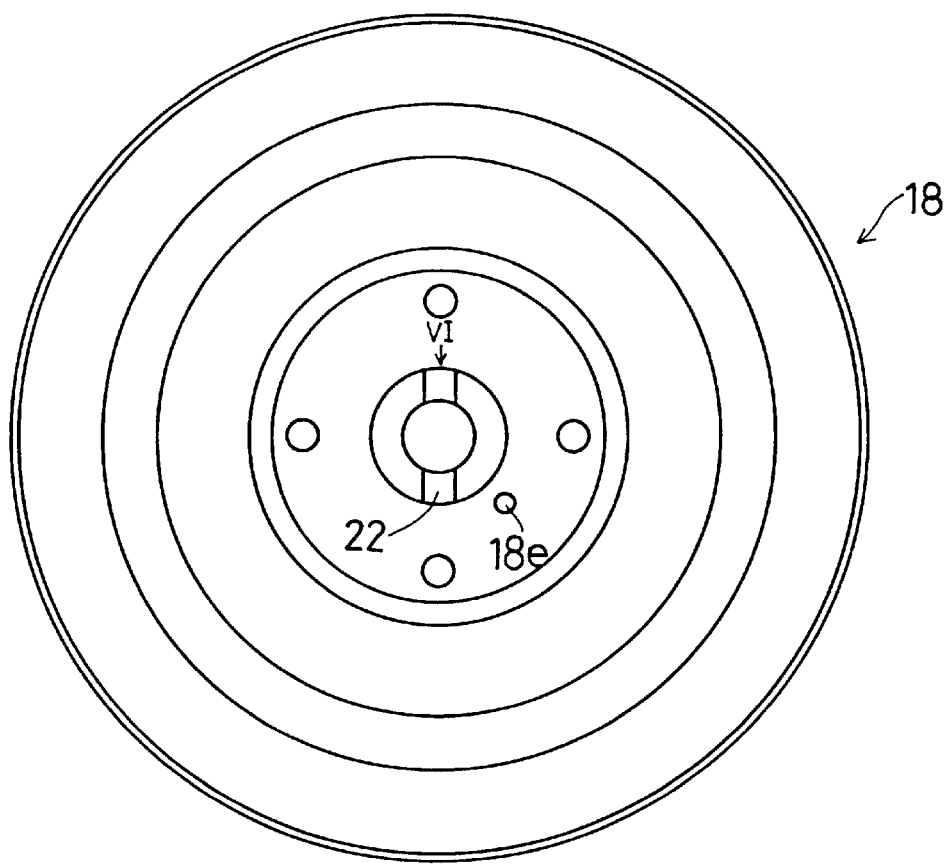
FIG. 5 is a plan view of a fixed sheave.
Figure 6:
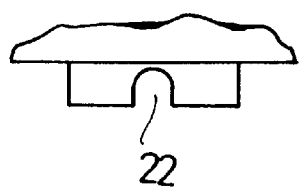
FIG. 6 is a partial side view of the fixed sheave viewed in direction of the arrow IV of FIG. 5.
Figure 7:
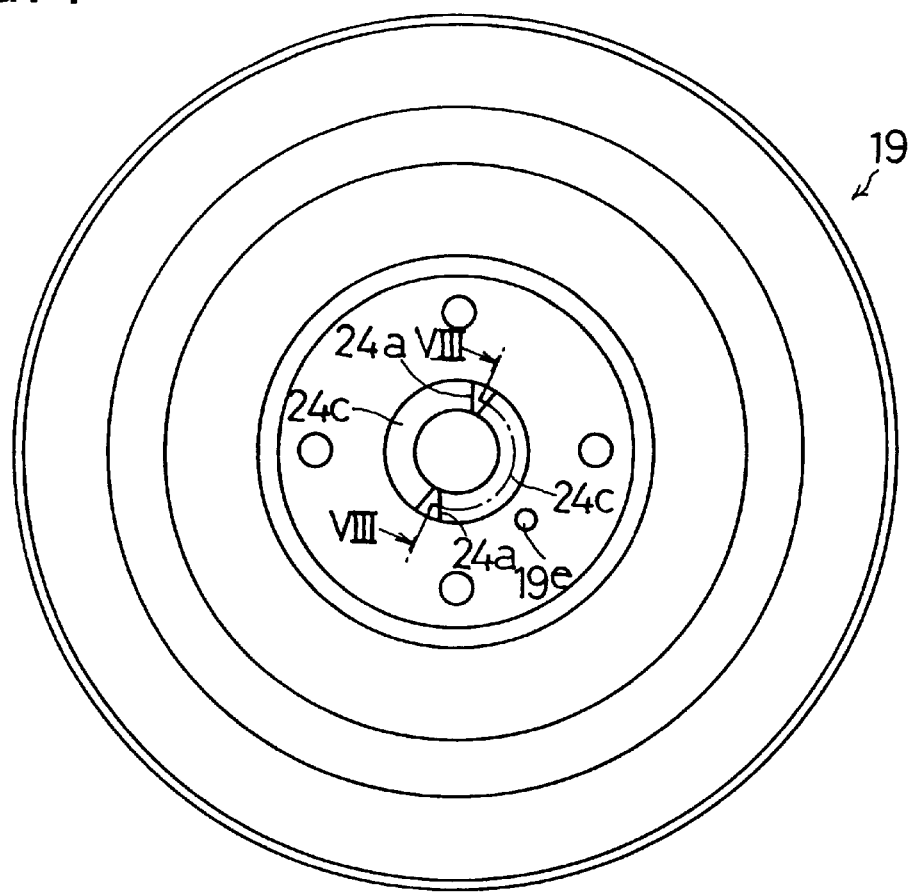
FIG. 7 is a plan view of a movable sheave.
Figure 8:
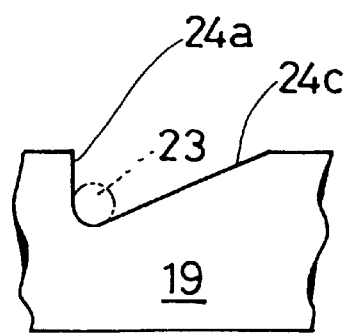
FIG. 8 is a partial sectional view of the movable sheave taken along the line VIII—VIII of FIG. 7.

Next, construction of the driven pulley 12 will be described with reference to FIG. 2. The driven pulley comprises a fixed sheave 18 fixed to the input shaft 16, and a movable sheave 19 fitted to the input shaft 16 so as to slide in the axial direction as well as rotate. The fixed sheave 18 and the movable sheave 19 have boss members 18a, 19a and plate members 18b, 19b, respectively. The boss members 18a, 19a have cylinder portion 18c, 19c extending along the input shaft 16 and flange portions 18d, 19d extending radially outward, respectively. The plate members 18b, 19b are formed in the same shape and extend radially outward from the flange portions 18d, 19d of the boss members 18a, 19a, having respective inner slant portions approaching each other, respective outer slant portions going away from each other and respective horizontal portions between the inner and outer slant portions. The horizontal portions are contacted with each other when a lower surface of the cylinder portion 19c of the boss member 19a touches an upper surface of the cylinder portion 18c of the boss member 18a. The belt 13 is wound in a V-shaped space formed by the outer slant portions. Radially inner parts of the plate members 18b, 19b are fixed to an upper surface of the flange portion 18d and a lower surface of the flange portion 19d, respectively, with rivets 20. Inner peripheries of the plate members 18b, 19b are contacted with outer peripheries of the cylinder portions 18c, 19c, respectively. The rivets 20 are arranged circumferentially at intervals of 90 degrees.

At a lower part of the input shaft 16, a lower pin 21 diametrically penetrates the input shaft 16 and is fixed thereto, and on a lower surface of the cylinder portion 18c of the fixed sheave 18 is formed a groove 22 (FIG. 5) engaging with the lower pin 21 to prevent circumferential relative movement of the fixed sheave 18 and the input shaft 16. At an upper part of the input shaft 16, an upper pin 23 diametrically penetrates the shaft 16 and is fixed thereto, and on an upper surface of the cylinder portion 19c of the movable sheave 16 is formed a circumferential groove 24 having a slant 24c (FIG. 4) engaging with the upper pin 23. The slant 24c constitutes a first engagement section provided on the movable sheave 19, and the upper pin 23 constitutes a second engagement section provided on the input shaft 16. The upper and lower pins 23, 21 have the same shape and axes of the upper and lower pins penetrating the input shaft 16 are laid on the same plane.

As shown in FIGS. 3, 4, 7 and 8, on an upper surface of the cylinder portion 19c of the movable sheave 19 is formed two grooves 24 symmetrically with respect to the input shaft 16. The groove 24 consists of a vertical face 24a parallel with the axis of the upper pin 23, a round bottom face 24b of the same radius as the upper pin 23 which is connected to the vertical face 24 smoothly and adapted to be contacted with the upper pin 23, and a flat slant 24c extending from the round bottom face 24b to the upper surface of the cylinder portion 19c. When the clutch 41 disconnects and the movable sheave 19 is most distanced from the fixed sheave 18 by force of a torsion coil spring 25 to be mentioned later, the upper pin 23 is positioned on the round bottom face 24b (two-dots-dash line in FIG. 4). When the clutch 41 connects, the movable sheave 19 is rotated relatively to the fixed sheave 18 against the force of the torsion coil spring 25 by a frictional force of the belt 13 acting on the movable sheave 19 and a resistant force due to a load of the rear wheel 5 acting on the fixed sheave 18 through the clutch 41 and the input shaft 16. At this time, the movable sheave 19 is moved toward the fixed sheave 18 until the lower surface of the cylinder portion 19c is contacted with the upper surface of the cylinder portion 18c, when the upper pin 23 is positioned halfway of the slant 24c.

The torsion coil spring 25 interposed between both the sheaves 18, 19 is disposed radially inside of the rivets 20 concentrically with the input shaft 16. Retaining holes 18e, 19e for retaining the respective ends of the torsion coil spring 25 are formed at angularly middle positions between the respective two adjacent rivets 20. An angle made by the retaining holes 18e, 19e around the axis of the input shaft is about 90 degrees when the clutch disconnects. When the clutch 41 connects, the angle approaches about 8 degrees due to the relative rotation of the sheaves 18, 19. The torsion coil spring 25 exerts to the movable sheave 19 a torsional spring force of counterclockwise direction as viewed from above (FIG. 3) and a tensile spring force by which the movable sheave 19 is moved away from the fixed sheave 18 along the axis of the input shaft 16.

When the engine 6 of the lawn mower 1 is stopped, the movable sheave 19 is most distanced from the fixed sheave 18 by spring force of the torsion coil spring 25, the effective diameter of the driven pulley 12 is maintained to a minimum, the upper pin 23 is positioned on the round bottom face 24b, and the clutch disconnects.

When the engine 6 starts, power of the engine 6 is transmitted to the hub 36 through the drive pulley 11, the belt 13, the driven pulley 12, the input shaft 16, the bevel gear 32, the drive shaft 33, the drive gear 34, the driven gear 35 and the key 37. However, since the clutch 41 disconnects, the rear axle 14 is not connected to the hub 36 and the input shaft 16 is in a non-load condition. The movable sheave 19 is rotating together with the fixed sheave 18 connected to the sheave 19 by the torsion coil spring 25. Since the belt is engaged with the driven pulley 12 at the position of the minimum effective diameter, tension of the belt 13 is minimum and the belt 13 runs round the sheaves 18, 19 with slippage. In this state, because the tension of the belt 13 is small, abrasion of the belt 13 due to contact with the driven pulley 12 is little, stress caused in the belt 13 is also little, and therefore life of the belt 13 can be prolonged.

When the clutch operation lever is operated to let the clutch 41 connect, the shifter 44 slides so that the claw 44a of the shifter 44 is meshed with the claw 36a of the hub 36 to connect the hub 36 with the axle 14, and load of the rear wheel 5, which is stopped, acts on the input shaft 16. Accordingly, on the fixed sheave 18 acts a resistant force in a direction opposing the rotation owing to the load of the rear wheel 5 while on the movable sheave 19 acts a force in a direction of the rotation owing to the frictional force of the belt 13 continuously. When a force resulting from the frictional force acting on the movable sheave 19 and the resistant force acting on the fixed sheave 18 exceeds the torsional spring force and the tensile spring force of the torsion coil spring 25, a relative rotation or a difference of rotational speeds occurs between the movable sheave 19 and the fixed sheave 18 against the above spring forces. As a result, the movable sheave 19 rotates with the slant 24c of the cylinder portion 19c engaging with the upper pin 23 fixed to the input shaft, so that the movable sheave 19 moves toward the fixed sheave 18 and the distance between both the sheaves 18, 19 shortens gradually. On the one hand, the belt 13 continues to run with slippage and moves radially outward with respect to both the sheaves 18, 19. In this course, the belt tension becomes larger gradually, therefore slippage of the belt 13 becomes smaller gradually.

When the lower surface of the cylinder portion 19c is contacted with the upper surface of the cylinder portion 18c to complete approach of the movable sheave 19 to the fixed sheave 18 and the effective diameter of the driven pulley 12 becomes maximum, a predetermined tension is caused in the belt 13, therefore almost no slippage of the belt 13 occurs, power of the engine 6 is transmitted effectively to the input shaft 16 or the rear wheel 5 to run the lawn mower 1. This state is maintained as long as the clutch 41 connects.

Since the belt 13 is running with slippage at the moment that the clutch 41 connects, power of the engine 6 is transmitted to the drive wheel gradually rather than abruptly so that no sudden large load acts on the clutch 41. Therefore, rigidity of the clutch 41 can be smaller than that of conventional one, miniaturization and lightening of the apparatus is possible and working nature and operating nature of the lawn mower 1 can be improved. Moreover, since no excessive tension is caused in the belt 13 on connection of the clutch 41, life of the belt 13 is prolonged.

Thus, inconvenience to be caused by an abrupt power transmission characteristic resulting from the fact that the clutch 41 is a claw clutch is dissolved and advantage of the claw clutch that the construction is simple and the cost is low can be fully exhibited.

In this lawn mower 1, when the clutch 41 connects, because power of the engine 6 is transmitted to the rear wheel gradually, the rear wheel 5 which has been stopped is not driven abruptly at a high rotative speed but gradually shifts to the high rotative speed state from the stopped state. Therefore, the rear wheel 5 does not fall down or tear lawn grasses, nor scrape the ground, so that finished state of the lawn is good.

Further, movement of the movable sheave 19 toward the fixed sheave 18 on connection of the clutch 41 is realized by the simple engaging construction of the pin 23 and the slant 24c utilizing the relative rotation between the sheaves 18, 19.

After that, if the clutch operation lever is operated to let the clutch 41 disconnect, the input shaft 16 becomes in the non-load state again, the resistant force acting on the fixed sheave 18 disappears and the same frictional force as that on the movable sheave 19 is acts on the fixed sheave 18. Therefore, the movable sheave 19 moves guided by the upper pin 23 contacted with the slant 24c of the movable sheave 19 until the upper pin 23 is positioned on the round bottom face 24b of the groove 24. Namely, the movable sheave 19 returns to the original most distant position. Thus, when the clutch 41 disconnects, the movable sheave 19 is returned to the distant position by torsional force and tensile force of the torsion coil spring 25.

In the above embodiment, the movable sheave 19 is moved toward the fixed sheave 18 utilizing load of the rear wheel 5 acting on the fixed sheave 18 on connection of the clutch 41, however, in place of this, a cam mechanism or a lever mechanism for moving the movable sheave 19 toward and away from the fixed sheave 18 and an operation lever for operating the cam or lever mechanism may be provided. The operation lever is operated in accordance with connection and disconnection of the clutch 41 to move the movable sheave 19 toward and away from the fixed sheave 18 through the cam or lever mechanism.

Though in the above embodiment the first engagement section is the slant 24c formed on the movable sheave 19 and the second engagement section is the upper pin 23 fixed to the input shaft 16 and engaging with the slant 24c, the first engagement section may be a pin and the second engagement section may be a slant. Or the pin may be replaced with a projection. Or the first engagement section and the second engagement section may be formed on the movable sheave 19 itself and the fixed sheave 18 itself, respectively. After all, any engagement mechanism which moves the movable sheave 19 toward and away from the fixed sheave 18 in accordance with relative rotation between the movable sheave 19 and the fixed sheave 18 can be used.

In place of the torsion coil spring 25 having an end retained at the retaining hole 18e formed in the flange portion 18d of the fixed sheave 18, a spring having an end retained at the input shaft 16 and another end retained at the movable sheave 19 may be used.

In the above embodiment, the working machine is a self-propelled lawn mower, but the working machine may be a self-propelled grass mower or any other running work machine.

What is claimed is:

1. A power transmission apparatus of a working machine, comprising:

a clutch disconnecting and connecting power of an engine with a drive wheel;

an input shaft transmitting said power to said clutch;

a pulley having a movable sheave fitted on said input shaft rotatably and movably in an axial direction of said input shaft, and a fixed sheave fixed to said input shaft;

a belt wound round said pulley transmitting said power to said input shaft through said pulley; and movable sheave position control means for moving said movable sheave away from said fixed sheave when said clutch disconnects and move said movable sheave toward said fixed sheave when said clutch connects.

2. A power transmission apparatus of a working machine as claimed in claim 1, wherein said movable sheave position control means comprising:

a spring having an end fixed to said movable sheave and another end fixed to said fixed sheave or said input shaft for moving said movable sheave away from said fixed sheave when said clutch disconnects;

a first engagement section provided on said movable sheave; and a second engagement section provided on said fixed sheave or said input shaft which is engaged with said first engagement section by relative rotation between said movable sheave and said fixed sheave to move said movable sheave toward said fixed sheave against spring force of said spring when said clutch connects.

3. A power transmission apparatus of a working machine as claimed in claim 2, wherein said first engagement section is a circumferential slant formed on said movable sheave, and said second engagement section is a pin fixed to said input shaft.

4. A power transmission apparatus of a working machine as claimed in claim 2 or 3, wherein said spring is a torsion coil spring.

5. A power transmission apparatus of a working machine as claimed in claim 1, wherein said clutch is a claw clutch.

* * * * *